United States Patent

Lee et al.

[15] 3,694,919
[45] Oct. 3, 1972

[54] DENTAL ARTICULATOR

[72] Inventors: Robert L. Lee, Colton; Jacob L. Schwartz, Whittier; Peter P. Klepa, Los Angeles, all of Calif.

[73] Assignee: Dentonamics Corporation, Inglewood, Calif.

[22] Filed: Dec. 2, 1970

[21] Appl. No.: 94,443

[52] U.S. Cl. ..................................................32/32
[51] Int. Cl. ...............................................A61c 11/00
[58] Field of Search...........................................32/32

[56] References Cited

UNITED STATES PATENTS

| | | | |
|---|---|---|---|
| 3,206,852 | 9/1965 | Swanson | 32/32 |
| 3,387,369 | 11/1968 | Swanson | 32/32 |
| 1,733,507 | 10/1929 | McCollum | 32/32 |

*Primary Examiner*—Robert Peshock
*Attorney*—Beehler, Arant & Jagger

[57] ABSTRACT

A dental articulator including a lower frame, an upper frame, a pair of spherical styluses mounted on the lower frame for providing the condyle parts of simulated temporomandibutlar joints, a pair of analog blocks removably attached to the upper frame for providing the socket parts of the simulated joints, an incisal rest pin on the front end of the upper frame for supporting the upper frame in a selected position of vertical adjustment, and separate means on the two frames for securing their respective dental casts.

For transferring casts into the articulator, there are dimples provided on the laterally outward ends of the analog blocks to indicate the hinge axis, and an alignment device on the upper articulator frame to indicate the plane of the orbital nose point.

For convenient operation of the articulator a centric alignment device is provided having cooperating parts on the upper and lower frames, and also including a releasable lock for the alignment device.

14 Claims, 26 Drawing Figures

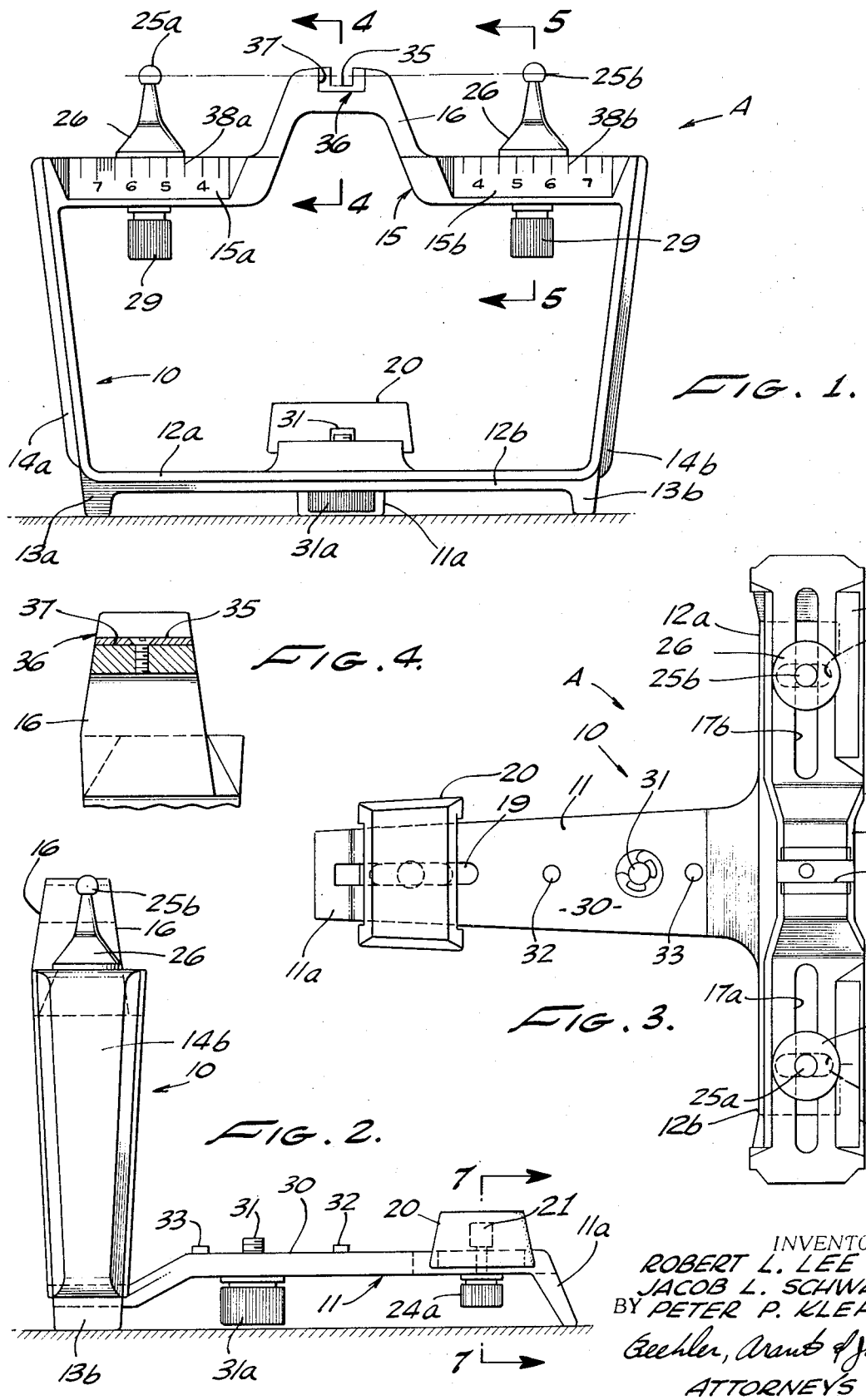

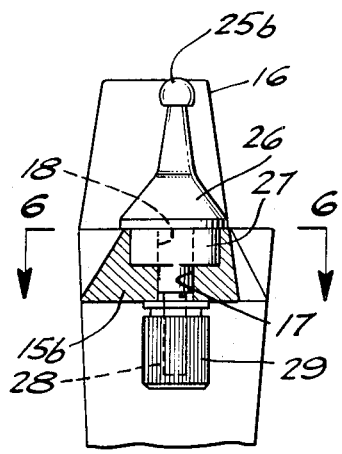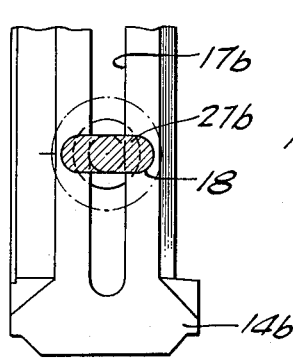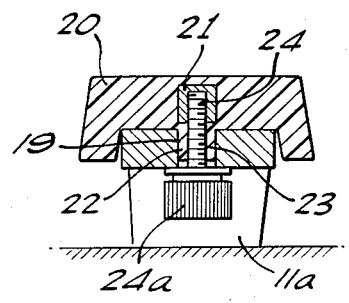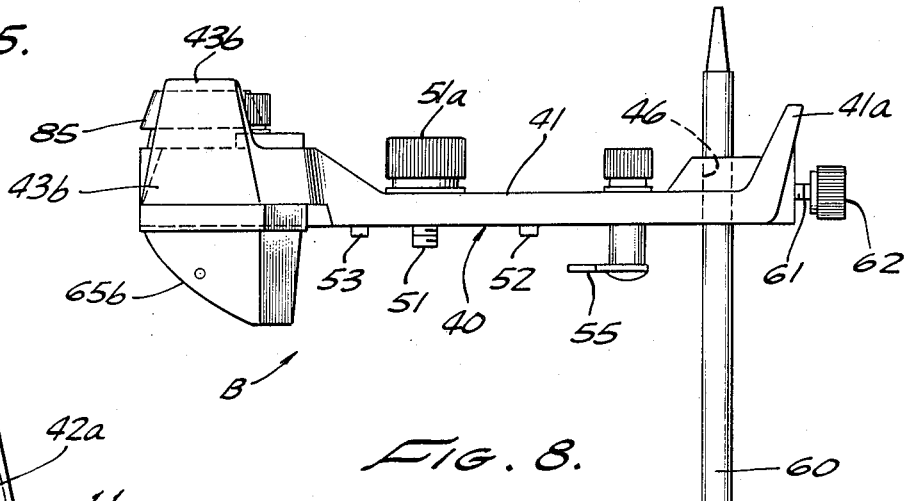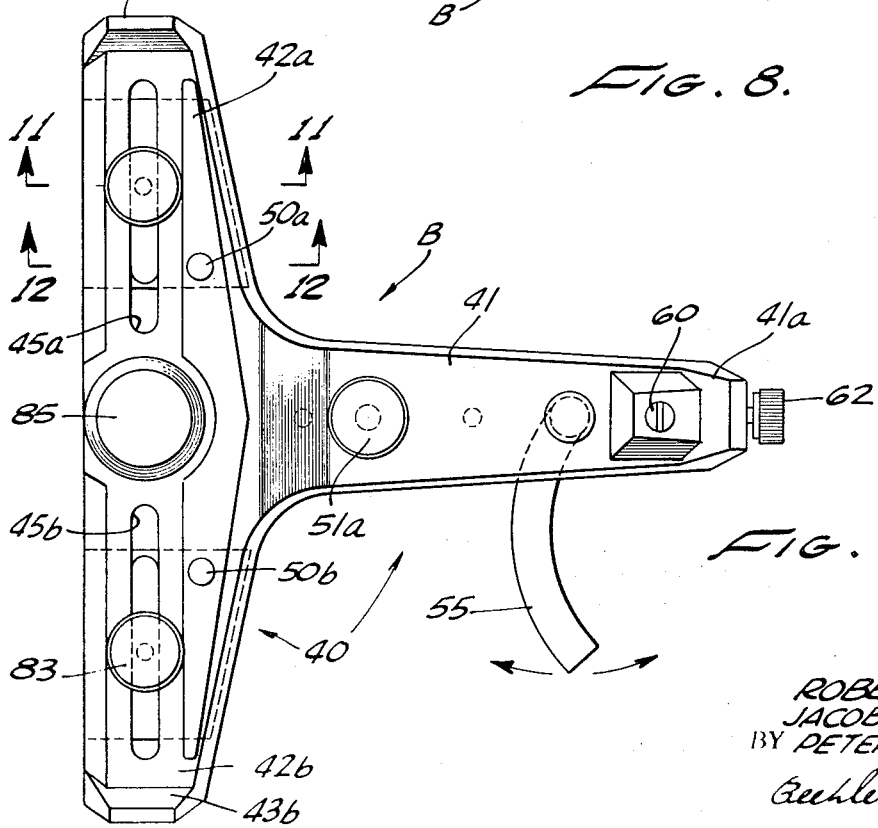

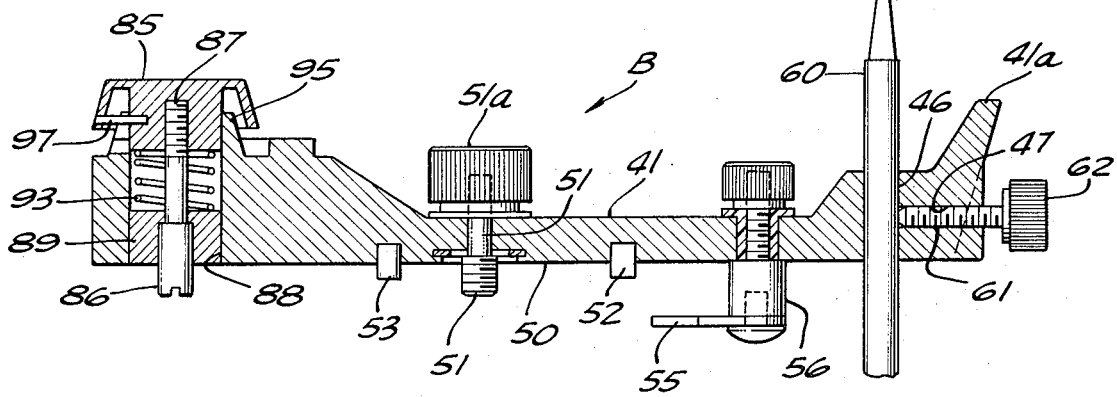
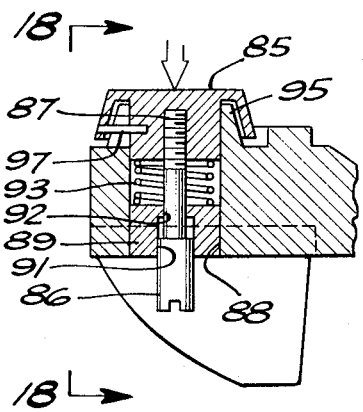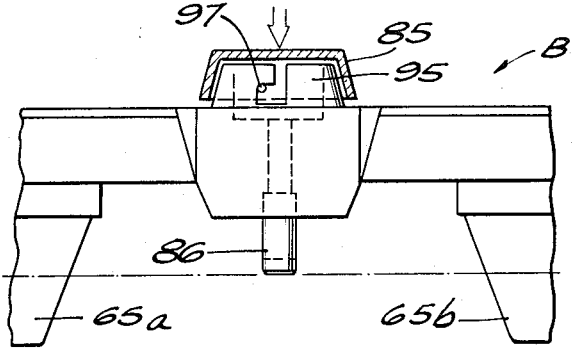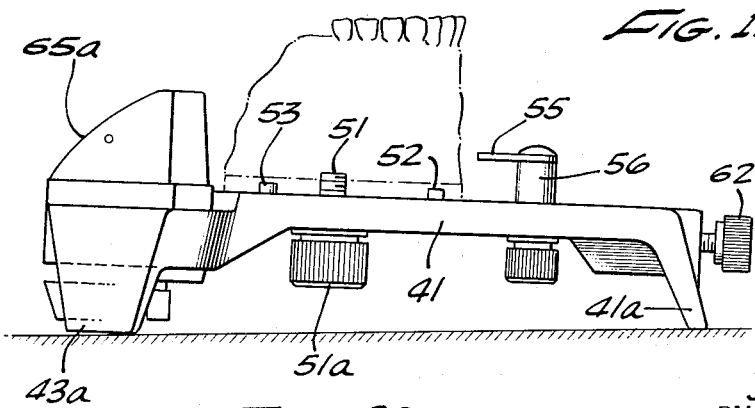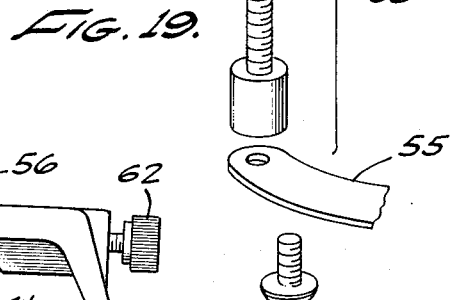

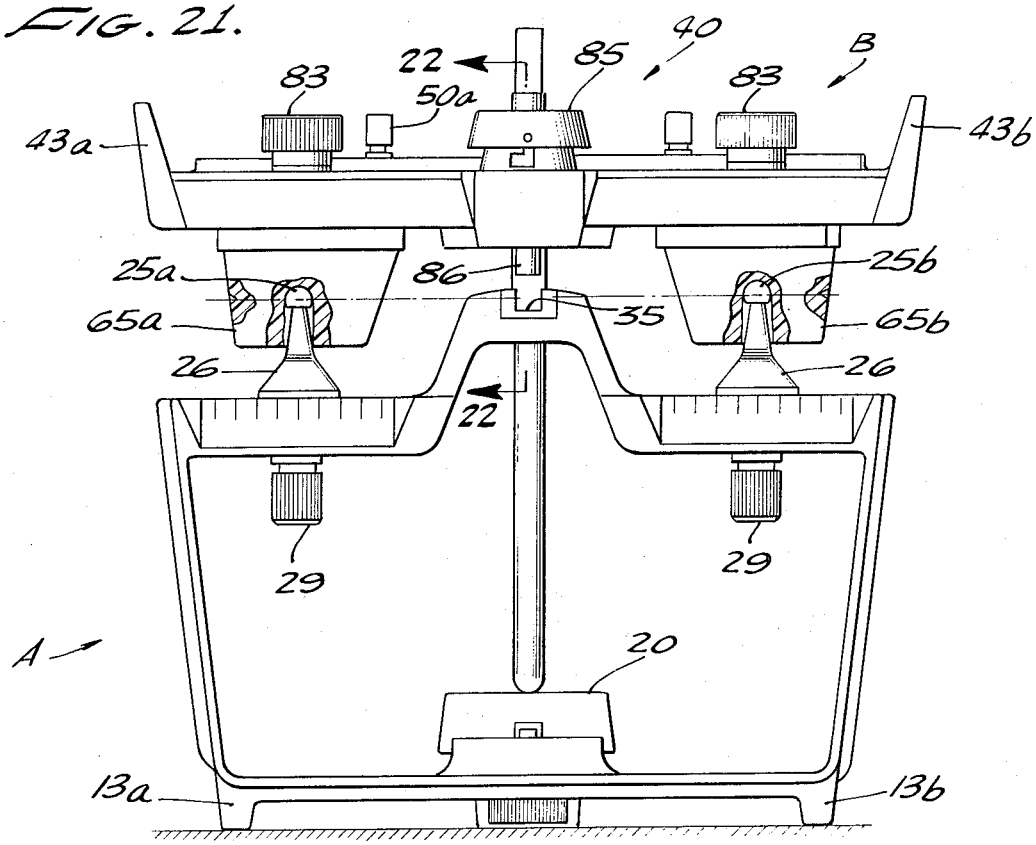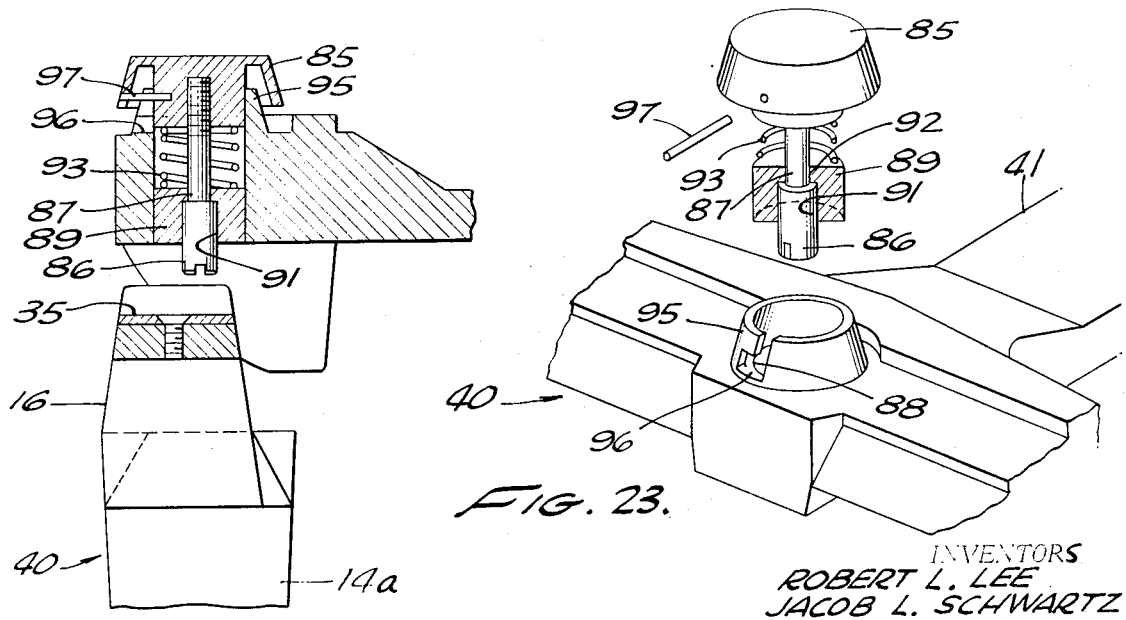

INVENTORS
ROBERT L. LEE
JACOB L. SCHWARTZ
BY PETER P. KLEPA

Buchler, Arant & Jagger
ATTORNEYS

DENTAL ARTICULATOR

BACKGROUND OF THE INVENTION

The present invention represents an improved form of the dental articulator which is shown in U.S. Pat. No. 3,452,439 issued to Robert L. Lee, and more specifically, which is shown in FIGS. 60 to 69, inclusive, of that patent.

The Lee articulator is also shown and described in an article entitled "Jaw Movements Engraved in Solid Plastic for Articulator Controls, Part II, Transfer Apparatus," by Robert L. Lee, which appeared in The Journal of Prosthetic Dentistry, Volume 22, No. 5, pages 513 to 527, November 1969.

According to the Lee method of recording and reproducing jaw movements, there are three distinct phases of the overall operation.

During Phase I the static reference points for the hinge axis and the orbital (nose) point are located and marked, and dynamic movements of the patient's jaws are recorded relative to these reference points.

During Phase II the dynamic movement information is transferred and converted from the original set of records into a pair of analog blocks, suitable for replay in the articulator. The movement information is incorporated into the analog blocks by cutting openings in them which differ somewhat from the shapes of the sockets of the patient's real joints, but which when used as part of the simulated joints of the articulator will reproduce the same relative motion pattern as the patient's real joints. During the dynamic movement transfer, Phase II, the analog blocks are so oriented that the dynamic movement information which is inserted into them will be properly related to the orbital-axis plane of the articulator when the analog blocks are later attached into the articulator.

During Phase III a complete simulator for the chewing mechanism of a particular patient is constructed. This complete simulator includes the articulator per se, the analog blocks, and the dental casts. First the analog blocks are inserted in their proper positions, and then a transfer face bow is used for inserting dental casts in the articulator in their properly aligned relationship to the orbital-axis plane of the articulator.

After the simulator is completed it is then used for the purposes of practical dentistry, in whatever manner is desired. The actual usage of the simulator might be considered as Phase IV, and is the period of time when the advantages and benefits of the Lee method are realized.

SUMMARY OF THE INVENTION

According to the present invention the analog blocks of Lee have been modified and improved in order to facilitate both their production and their use. A separate holder for the analog block is eliminated, and a single rigid, integrally constructed analog block is substituted. Special features of the analog block of the present invention provide artistic appearance and convenience in use, and also facilitate molding of the parts on a mass production basis.

According to the present invention the lower frame of the articulator is integrally constructed, with downturned flanges providing legs. The upper frame is likewise integrally constructed, with upwardly turned flanges providing legs, and the length of the legs on the upper frame is such that the entire articulator may be turned upside down and supported by the legs of the upper frame while the casts are being placed in their aligned positions.

A further improvement achieved according to the present invention is that both the lower and upper frames have been provided with an outwardly flared configuration, the top being wider than the bottom, which configuration provides a unique artistic appearance and also facilitates the practical useage of the articulator.

Other improvements achieved in accordance with the present invention are modified configurations of both the upper and lower frames of the articulator, to improve their appearance and strength while at the same time increasing the working space available for the dentist or laboratory technician who must use the articulator. Yet another improvement in accordance with the invention is a centric alignment device which is simple, rugged, and efficient. The alignment device may be locked in position when it is desired to open or close the articulator about its hinge axis. The lock may be released when the articulator is to be moved so as to simulate twisting movements of the mandible.

Thus the objects of the present invention are to provide an improved dental articulator, and analog block for use therein, which are economical to manufacture by available mass production techniques and which are accurate, reliable, and convenient in useage.

DRAWING SUMMARY

FIG. 1 is a rear elevational view of the articulator lower assembly;

FIG. 2 is a side elevational view of the articulator lower assembly;

FIG. 3 is a top plan view of the articulator lower assembly;

FIG. 4 is a fragmentary cross-sectional view taken on the line 4—4 of FIG. 1;

FIG. 5 is a fragmentary cross-sectional view taken on the line 5—5 of FIG. 1;

FIG. 6 is a fragmentary cross-sectional view taken on the line 6—6 of FIG. 5;

FIG. 7 is a fragmentary cross-sectional view taken on the line 7—7 of FIG. 2;

FIG. 8 is a side elevational view of the articulator upper assembly;

FIG. 9 is a top plan view of the articulator upper assembly;

FIG. 16 is a longitudinal cross-sectional view of the articulator upper assembly, taken on the line 16—16 of FIG. 10;

FIG. 17 is a fragmentary cross-sectional view of the centric hold device of FIG. 16, but showing it in the locked position;

FIG. 18 is a fragmentary end elevational view taken on the line 18—18 of FIG. 17;

FIG. 19 is an exploded perspective view of the flag assembly;

FIG. 20 is a side elevation view of the articulator upper assembly, like FIG. 8 but with the incisal rest pin removed and being inverted for supporting a maxillary cast;

FIG. 21 is a rear end elevation view of the fully assembled articulator, but without the casts;

FIG. 22 is a fragmentary cross-sectional view taken on the line 22—22 of FIG. 21;

FIG. 23 is an exploded perspective view, partially in cross-section, of the centric hold device assembly;

PREFERRED EMBODIMENT

Figure 10:
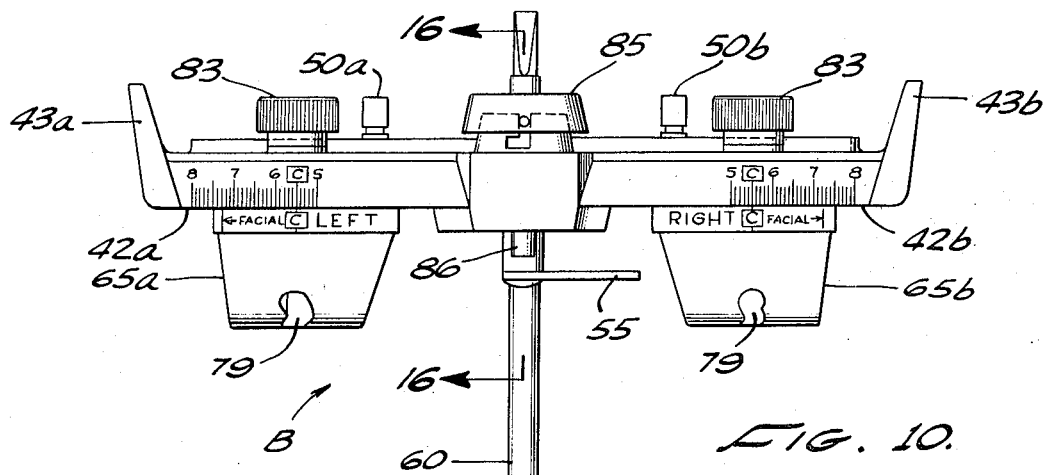
FIG. 10 is a rear end elevational view of the articulator upper assembly.

The lower assembly of the articulator will be described first. Then the structure of the upper assembly will be described. Finally, the operation of the instrument as a whole will be described.

Lower Assembly

Reference is now made to FIGS. 1 to 7, inclusive, illustrating the structure of the lower assembly, designated as A.

Lower frame 10 is cast as an integral unit. Frame 10 includes a forward arm 11 having a down-turned flange 11a at its forward extremity which provides a forward leg for the frame 10. From the rearward end of the forward arm 11 there extend in opposite lateral directions a pair of lateral (lower) arms 12a, 12b. On each of these lateral arms, at its outward extremity, a downwardly depending projection forms the rear legs 13a, 13b. Thus the frame 10 is supported as a tripod by the legs 11a, 13a, 13b.

Also from the outer extremities of the lateral arms 12a, 12b, there are respective posts 14a, 14b, which rise vertically upward, but are flared somewhat outwardly as well. From an artistic point of view the legs 13a, 13b are arranged to appear as extensions of the post 14a, 14b, respectively. The tops of the posts 14a, 14b, are joined by a lateral truss 15. The left lateral portion of the truss, as viewed in FIG. 1 from the rear of the instrument, is designated 15a, while the right lateral portion is designated 15b. The raised portion of the truss which intervenes between the left and right lateral portions forms a bridge designated as 16.

The lateral truss portions 15a, 15b, have longitudinally extending slideways 17a, 17b, formed therein, as best seen in FIG. 3. Each of these longitudinal slideways also has a transverse slot such as 18a, 18b, formed near its longitudinal center. There is a predetermined separation distance between the centers of the slots 18a, 18b, this distance typically being 110 millimeters.

There is also a slideway 19 formed in the forward arm 11 in its forward portion, which extends longitudinally of the forward arm.

A rest block 20 is supported on the forward end portion of forward arm 11, its position being secured by means of the slideway 19. As shown in FIG. 7 the rest block 20 has an insert portion 21 in its upper center. From the lower center block 20 a lug 22 extends downward, and is of such a width as to fit snugly within the slideway 19. An opening 23 is formed in the lug 22, and a screw 24 having a knurled head 24a extends upward through that opening 23 and engages a threaded opening in the insert 21. Thus by tightening the screw head 24a by hand, the rest block 20 may be secured in a particular position. Alternatively, by loosening the screw head 24a the rest block may be moved to a different longitudinal position relative to the forward arm 11 of the frame 10, before the screw 24 is again tightened.

The Lower Assembly also includes a pair of spherical styluses 25a, 25b, which are supported above the respective lateral truss portions 15a, 15b. Each stylus is supported above a vertically extending shank 26 which terminates in a conical base, and below the conical base there is an elliptical base 27. Elliptical base 27 is of such configuration as to slide longitudinally in the slideway 17. Alternatively, the elliptical base 27 may be turned at a right angle and snugly received in the corresponding transverse slot 18. This latter position of the elliptical base is shown in FIGS. 3, 5, and 6. These drawing figures represent the operative position of the articulator, which is used after the dental casts have been positioned in the instrument.

A screw 28 has its upper end rigidity received within a central opening in the elliptical base 27, and has a threaded lower end which projects downward through the remaining portion of slideway 17 and hence on beneath the truss 15. A knurled knob 29 is fastened to the threaded lower end of the screw 28, hence by tightening knob 29 the corresponding stylus 25 may be secured firmly in position. Alternatively knob 29 may be loosened whenever it is desired to move the elliptical base 27 from the slot 18 to the slideway 17, or vice versa.

A flat mounting surface 30 is provided on the upper surface of forward arm 11, in the intermediate portion thereof. A screw 31 projects upward through an opening in the arm 11 for attaching a dental mounting plate, not specifically shown. A knurled head 31a attached to the lower end of screw 31 is used for tightening. A forward dowel pin 32 is secured in the upper surface of arm 11 at a position somewhat forward of the screw 31, while a rearward dowel pin 33 is similarly secured in a somewhat rearward position. Dowel pins 32, 33 project above the surface 30 only a short distance, such as approximately one-quarter inch, in order to firmly establish the position of a dental mounting plate fastened onto the forward arm 11.

In the bridge 16 of lower frame 10 a recess 37 is formed, which receives a press fitted insert 36. The insert 36 in its upper center has a rectangular centric notch 35, which is precision formed. The height of styluses 25 is such that their radius centers form a common axis which passes through a point approximately halfway between the top and bottom of the notch 35. This relationship is best shown in FIGS. 1, 2, and 21.

In the frame 10 the lateral truss portion 15a is provided with a measuring scale 38a while the lateral truss portion 15b is provided with a measuring scale 38b. The purpose of these scales is to indicate the lateral positions of the stylus carriages 26 in their respective slideways 17. These scales are used only when dental casts are being positioned in the articulator in order to complete the construction of the simulator.

UPPER ASSEMBLY

Reference is now made to FIGS. 8 to 19, inclusive, which illustrates the upper assembly B of the articulator.

An upper frame 40 is integrally formed from a single metallic member, and has a generally T-shaped configuration, much like the forward arm 11 and lateral arms 12 of the lower frame 10. In the upper frame 40 the forward arm is identified as 41 and the lateral arms as 42a and 42b, respectively. The forward arm 41 at its forward extremity has an up-turned flange which is usable as a forward leg, and the lateral arms at their extremities have up-turned flanges 43a, 43b, which are usable as rear legs. The lateral arms also have lateral slideways 45a, 45b, respectively, formed therein.

The forward arm 41, near the forward leg 41a, has a vertical opening 46 through which an incisal rest pin 60 passes. A threaded opening 47 is formed in the forward end of the forward arm 41, and intersects the opening 46. A holding screw 61 is threaded into the opening 47 and has a knob 62 which is used for locking the rest pin 60 in a selected position of vertical adjustment.

Figure 11:
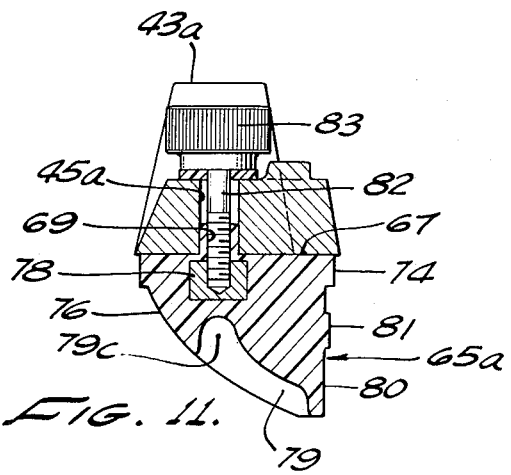
FIG. 11 is a fragmentary cross-sectional view taken on the line 11—11 of FIG. 9.

A pair of analog blocks 65a, 65b, form an essential part of the completed articulator assembly B. These blocks are shown in their assembled relationship in FIG. 10. The structure of the left analog block 65a is shown in detail in FIGS. 11 to 15, inclusive. A metal insert 78, shown in FIG. 11 is partially encapsulated within the block 65a. The block 65a and insert 78 embedded within it together constitute a simulated upper joint member.

Figure 13:
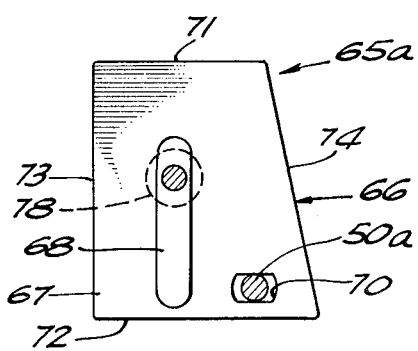
FIG. 13 is a top plan view of the left analog block taken on the line 13—13 of FIG. 12.
Figure 14:
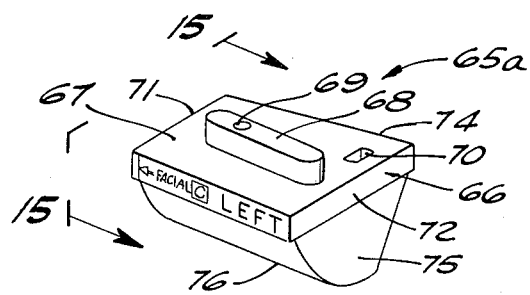
FIG. 14 is a perspective view of the left analog block.
Figure 15:
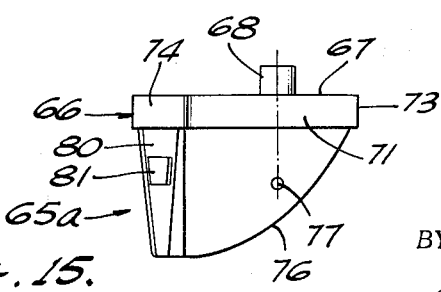
FIG. 15 is a side elevational view of the analog block taken on the line 15—15 of FIG. 14.

The simulated joint member is described in detail as follows. The analog block 65a is a solid body of rigid plastic material, and is preferably integrally cast in a mold. As perhaps best seen in FIG. 14, a perspective view, the block 65a includes an upper or pedestal portion 66 and a socket portion 75 which extends downwardly from the under side of the pedestal. FIGS. 13 to 15, inclusive, illustrate the block prior to the cutting of a simulated socket therein. FIGS. 10 and 11 show the location in the block 65a where a simulated socket 79 is cut, and also show a typical configuration for the simulated socket, although it will of course be understood that this characteristic differs significantly from one patient to the next, and it is those significantly different individual characteristics of various patients which necessitate the use of the apparatus of the present invention.

Referring specifically now to FIGS. 13 to 15, inclusive, the pedestal portion 66 of block 65a has an upwardly disposed mounting surface 67 which is generally flat, however, an upwardly extending lug 68 is formed thereon. Mounting surface 67 has a small end 71 and a large end 72 which are cut square and lie parallel to each other. The mounting surface 67 also has a straight side 73 which extends longitudinally between the ends 71, 72, and is perpendicular to both, as well as a sloping side 74 which slopes inwardly as it extends from the large end 72 toward the small end 71.

The raised lug 68 is of a generally rectangular configuration, having an appropriate width to slide snugly within the slideway 45a. Lug 68 is aligned so that its longitudinal axis is precisely parallel to the straight side 73 of the block 65a. The ends of lug 68 are rounded, one end being inset somewhat from the large end 72 of the block, and the other end of lug 68 extending somewhat beyond the longitudinal center of the block.

A threaded hole 69 is formed in the upper surface of lug 68, and is located very near the center of the mounting surface 67 of block 65a. As best seen in FIG. 11 the metal insert 78 is encapsulated, at least partially, somewhat below the mounting surface 67, and has a threaded opening which forms the lower part of the threaded opening 69. Mounting surface 67 together with lug 68 and threaded hole 69 is utilized for aligning the block 65a in the desired position, and securing it firmly in place.

As best seen in FIGS. 11 and 15, from the sloping side 74 of pedestal 66 the block 65a extends vertically downward with a straight side wall 80. A small raised portion 81 on the side wall 80 is typically used for bearing a label to identify the analog block as belonging to a particular patient. From the straight side 73 the block extends downward in a convex curve 76, whose curvature corresponds approximately to that of a quarter circle, so that a transverse cross-section of the block as seen in FIG. 11 corresponds approximately to a quarter cylinder.

On the small end of block 65a, below the narrow end 71 of mounting surface 67, a dimple 77 is formed for purpose of hinge axis alignment. As best seen in FIG. 15 the dimple 77 is located in the same vertical plane as the lateral center of lug 68, and hence the same vertical plane as the threaded opening 69.

Figure 12:
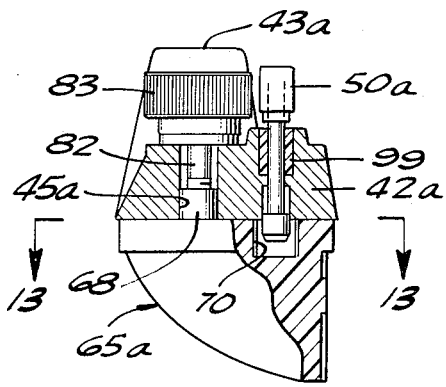
FIG. 12 is a fragmentary cross-sectional view taken on the line 12—12 of FIG. 9.

In the operation of the apparatus the mounting surface 67 bears tightly against the under surface of lateral arm 42a, as best shown in FIG. 12. A screw 82 having a knurled knob 83 passes through the slideway 45a into the threaded opening 69, and hence the tightening of knob 83 locks the block firmly in position.

A positioning hole 70 is also formed in the mounting surface 67 of the block 65a. As shown in FIGS. 13 and 14 the positioning hole 70 is located close to the large end 72 of the block, and also close to the sloping side 74. Positioning hole 70 is used for establishing a selected longitudinal position of the block, as will later be described.

The maximum dimension of block 65a is its length measured between the ends 71 and 72, which is approximately 1 ½ inches. Both the width and the depth of the block are somewhat less than its length. It will be noted that the block tapers from its relatively small end in which the dimple 77 is formed to a greater width at its other end, which configuration very much facilitates the process of integrally forming the block in a mold and then removing it from a mold, for purpose of mass production.

The upper assembly B also includes a pair of dowel pins 50a, 50b, which are carried by respective lateral arms 42a, 42b of the upper frame 40. See FIGS. 9 and 12. As shown in FIG. 12, each dowel pin is so arranged relative to a corresponding opening in the upper frame that it can be raised and withdrawn within the frame, frictionally held by bushing 99, or it can be moved downward so that its lower end protrudes below the lateral arm. The lower end of each dowel pin fits snugly into the corresponding positioning hole 70 of the associated analog block, as is shown in FIG. 13. Thus when the analog blocks are spaced at their predetermined separation distance, they are locked in their respective longitudinal positions by the dowel pins 50a, 50b. Each simulated socket 79 has a centric reference point 79c, which represents the radius center of the extreme upper portion of the socket, as shown in FIG. 11. In the predetermined separation distance of the two analog blocks the centric reference points 79c are separated by the same standard distance as the radius centers of the styluses 25, which as previously mentioned is typically 110 millimeters.

The forward arm 41, on its under surface intermediate its length, has a mounting surface 50 which is adapted to receive a mounting plate for a maxillary cast. A screw 51 with screw head 51a, forward dowel pin 52 and rear dowel pin 53, are also provided, which have the same structure and function as their counterparts in the articulator lower assembly.

The upper assembly B also includes a flag 55 which is rotatably mounted on a post 56. The post 56 is secured to the forward arm 41 of the upper frame 40 and located intermediate to the forward dowel pin 52 and the incisal rest pin opening 46. Details of the flag and post are shown in FIGS. 16 and 19. The under surface of flag 55 is aligned in a common plane with dimples 77 of the two analog blocks 65a, 65b. These three reference points establish the orbital-axis plane of the articulator.

Another important feature of the upper assembly B is the centric reference button 85 which controls the centric reference shaft 86. See FIGS. 10, 16, 17, 18, and 21 through 26. The centric hold device is not needed when inserting the maxillary cast into the upper assembly (supported from mounting surface 50), nor is it needed for the attachment or placement of the analog blocks 65. However, after the maxillary cast has been inserted it is used for aligning the mandibular cast in the lower assembly of the articulator. It is also used subsequently during the usage of the articulator for purposes of dentistry.

Figure 25:
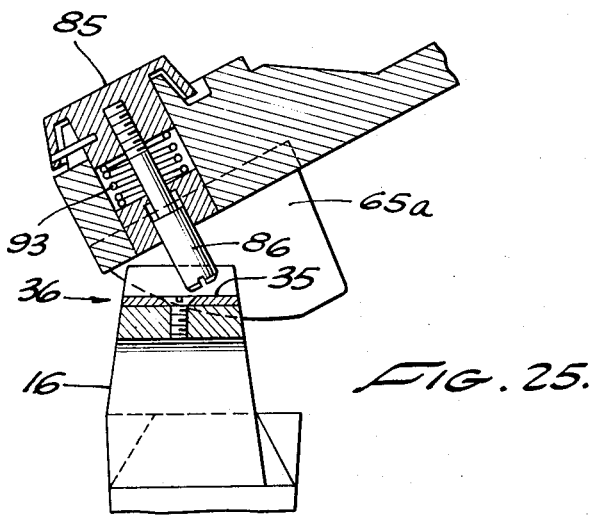
FIG. 25 is a fragmentary cross-sectional view of the centric hold device in the position that it occupies in FIG. 24.
Figure 26:
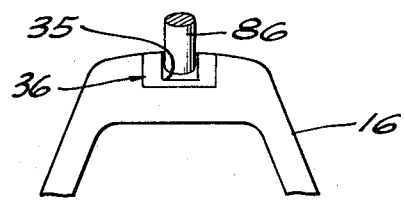
FIG. 26 is a fragmentary rear end elevation view showing the locked position of the centric hold device.

The purpose of the shaft 86 is to slide into the centric notch 35, as shown in FIGS. 25 and 26, and to make a rotating pivot joint therewith. An upper shaft 87 extends upward from the centric shaft 86 and is threaded into the button 85. A large cylindrical opening 88 is formed in the frame 40 at the juncture of the arms 41, 42. A cylindrical insert or plug 89 fills the bottom portion of the opening 88 and is adhesively bonded in place. See FIGS. 16 and 23. Plug 89 has a centrally located hole 91 on its under surface, which is of such a diameter that the centric shaft 86 may be partially withdrawn therein. Plug 89 also has a smaller opening 92 communicating between its upper surface and opening 91, and the shaft 87 which is of smaller diameter than shaft 86 passes through the opening 92. During fabrication the shafts 86 and 87 are fastened together, then passed upward through openings 91, 92 of the plug 89, and then the upper end of shaft 87 is threaded into an opening in the under surface of centric button 85. The result of this arrangement is that the centric hold assembly consisting of the button 85 and shafts 86 and 87 may reciprocate up or down a certain distance, but this assembly is captured in place and cannot fall out. The lower end of shaft 86 has a screw driver slot which facilitates disassembly for cleaning.

The cylindrical opening 88 above the plug 89 provides a spring well, see FIG. 16, within which a spring 93 is received. Spring 93 pushes the button 85 upward so that the centric hold shaft 86 is normally in its raised or retracted position.

A circular flange 95 is formed on the upper surface of the frame 40, as most clearly seen in FIG. 23. The flange 95 has an L-shaped notch or groove 96 formed in the outer wall thereof. Centric button 85 is formed with an overhanging skirt or flange, in which a horizontal opening is formed, and a locking pin 97 inserted into the button 85 is adapted to move up and down in the vertical part of the L-shaped opening 96. Button 85 may therefore be depressed and rotated slightly, and locking pin 97 will be locked in the extremity of the L-shaped opening 96. To release the centric hold device the button 85 is rotated in the opposite direction, and the button will then be raised by force of the spring 93.

OPERATION

When inserting dental casts in the articulator it is convenient to turn the instrument upside down, to facilitate the installation of the mandibular cast. As shown in FIG. 20 the legs 41a, 43a, 43b, of the upper frame 40 are long enough to support the frame, inasmuch as they extend beyond the centric button 85, dowel pins 50, mounting screw head 51a, and flag post 56.

Figure 24:
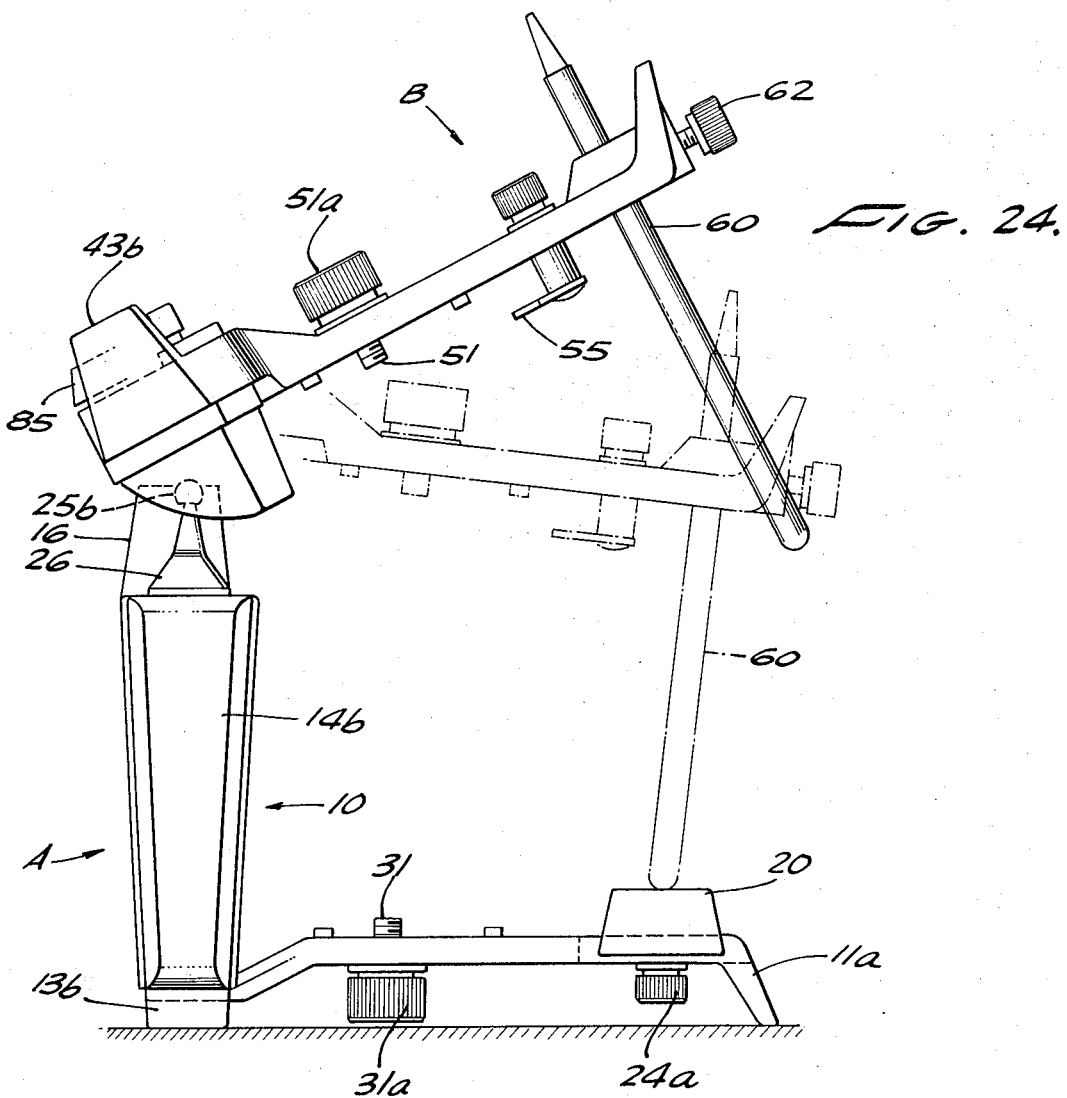
FIG. 24 is a side elevation view of the fully assembled articulator showing the raised position of the upper assembly.

Prior to the mounting of casts the lateral slideways 17 and 45 are used for purpose of aligning a transfer face bow with the orbital-axis plane of the articulator, all as described in the above referenced Lee article. After casts are in place, and the articulator is in actual usage, the centric hold device may be locked for swinging the instrument open about the hinge axis, as shown in FIG. 24 or for actuating the instrument to simulate a protrusive movement. However, when border movements are to be retraced, the centric hold device is unlocked.

Having described the invention in accordance with a certain embodiment thereof, it is to be understood that further modifications may now suggest themselves to those skilled in the art and it is intended to cover such modifications as fall within the scope of the appended claims.

What is claimed is:

1. A dental articulator comprising, in combination:
   an upper frame having a pair of lateral arms and a forward arm, and means for removably fastening a pair of simulated upper joint members to said lateral arms;
   a lower frame having a forwardly extending arm and a pair of laterally extending arms, posts rising from the lateral extremities of said lateral arms, a raised truss portion extending between said posts, and said raised truss portion having an upwardly opening longitudinal groove formed at its lateral center;
   a pair of spherical styluses representing simulated condyles extending upwardly above respective lateral portions of said truss;
   and a vertically extending shaft whose lower end is adapted to be received in said groove with a relatively snug fit, the upper end of said shaft being secured to the lateral center of said upper frame and being retractable for raising said lower end from said groove;

said upper frame having an opening through which said shaft upper end slidably extends, a knob on the upper end of said shaft, a spring well surrounding said shaft, a spring disposed in said spring well and normally urging said knob upward, and means for selectively locking said knob in a lowered position.

2. An articulator as in claim 1 wherein said locking means includes a pin projecting horizontally from one side of said knob, and an L-shaped slot formed in the upper end wall of said spring well, whereby said knob may be first lowered and then rotated into a locked position, as said pin enters the horizontal extremity of said slot.

3. An articulator as in claim 1 wherein said styluses have a common horizontal axis which passes through their radius centers and also transversely through said groove at a point intermediate to its top and bottom, and the lower end of said shaft is of cylindrical configuration.

4. A simulated upper joint member for reproducing jaw movements, comprising:

a solid body of rigid plastic material having a pedestal portion with an upwardly disposed mounting surface, and a socket portion depending downwardly from the under side of said pedestal portion for forming the socket part of a temporomandibular joint, said socket portion tapering to diminished breadth at its lower extremity remote from said pedestal portion, said socket portion on one lateral end thereof having a dimple indicating the hinge axis, said plastic body being relatively narrow at said one end in which said dimple is formed, and tapering to a greater width at its other end so that said plastic body may be integrally formed in and then removed from a mold;

and alignment means associated with said mounting surface for aligning said plastic body in a predetermined position in three dimensions relative to an instrument frame, and for removably securing the same in its aligned position.

5. A simulated upper joint member as claimed in claim 4 wherein said alignment means includes a lug formed on said mounting surface and integral with said plastic body, said lug having an upwardly disposed threaded opening formed therein; and which further includes a metal insert partially encapsulated within said plastic body to provide the lower portion of said threaded opening.

6. A simulated upper joint member as claimed in claim 4 wherein said alignment means includes a metal insert partially encapsulated within said plastic body, said insert having a threaded opening therein; and an opening formed in said mounting surface communicating with said threaded opening of said insert.

7. A simulated upper joint member adapted for reproducing jaw movements, including a solid body of rigid plastic material having a generally flat upper side, said body being somewhat elongated and the ends of said upper side being square and parallel to each other, one edge of said upper side being perpendicular to said ends thereof and the other edge being somewhat sloped relative to said one edge whereby said body has one narrow end and one wide end, said body extending substantially vertically downward from said sloped edge, and extending downward and inward in a convexly curved configuration from said one edge, whereby a vertical cross-section of said body approximates a quarter of a cylinder, said body having an elongated lug formed on said upper side thereof which extends parallel to said one edge, said lug having an upwardly disposed threaded opening formed therein at approximately the center of said upper side, said body having a retaining slot formed in said upper side adjacent the wide end of said body and said sloped edge, said body also having a dimple formed in the outer end wall of said narrow end thereof, for purpose of hinge axis alignment.

8. A simulated joint member as in claim 7 wherein said threaded opening and said dimple are aligned in the same vertical plane.

9. A simulated joint member as in claim 7 wherein a metal insert is partially encapsulated within said solid body of plastic material to provide the lower portion of said threaded opening.

10. A simulated joint member as in claim 7 wherein the ends of said elongated lug are rounded and are spaced inwardly from the ends of said flat upper side.

11. A dental articulator upper frame having a pair of lateral arms and a forward arm, centric reference means associated with the lateral center of said lateral arms, means for removably fastening a pair of simulated upper joint members beneath said lateral arms with a predetermined separation distance therebetween, means for attaching a mounting plate for a maxillary case beneath the rearward portion of said forward arm, and the extremities of all three of said arms having upwardly and outwardly extending tapered flanges thereon which are usable as legs when said frame is inverted, said legs being of sufficient length to extend above the mechanisms of said centric reference means, fastening means, and attaching means;

said lateral arms, forward arms, and flanges being integrally formed as a single metallic member.

12. In a dental articulator, an upper frame having a pair of lateral arms and a forward arm, said lateral arms being raised somewhat above the level of said forward arm, a pair of simulated upper joint members, each formed from a solid body of rigid plastic material and having an upwardly disposed pedestal portion of substantially uniform vertical thickness and a downwardly depending socket portion underneath said pedestal portion for forming a simulated socket, and means removably securing the upper surface of each of said simulated joint members to the under surface of a corresponding one of said lateral arms;

the thickness of said pedestal portions being substantially equal to the distance by which said lateral arms are raised relative to said forward arm, whereby the upper ends of said socket portions are substantially aligned with the under surface of said forward arm.

13. A dental articulator comprising:

generally T-shaped upper and lower frames, each being integrally formed as a single metallic member, each of said frames having a pair of lateral arms and a forward arm;

centric reference means cooperatively associated with the lateral center of the lateral arms of both of said frames;

means for removably fastening a pair of simulated upper joint members beneath said lateral arms of said upper frame with a predetermined separation distance between said joint members;

means for attaching upper and lower mounting plates to the rearward portion of the forward arms of said upper and lower frames, respectively;

simulated condyle means supported above the lateral arms of said lower frame and adapted to cooperate with said simulated upper joint members;

incisal pin means coupled to the forward portion of the forward arm of said upper frame for supporting same in substantially parallel relationship to the forward arm of said lower frame, the forward extremity of the forward arm of said lower frame having a downwardly and outwardly extending tapered flange thereon providing a let for said articulator;

the lateral arms of said upper frame being offset upwardly relative to the forward arm thereof, and the lateral arms of said lower frame being offset downwardly relative to the forward arm thereof, whereby the vertical separation between said lateral arms of the frames is substantially greater than the vertical separation between said forward arms.

14. A dental articulator as claimed in claim 13 wherein the extremities of all three of said arms of said upper frame have upwardly and outwardly extending tapered flanges thereon which are usable as legs when said articulator is inverted.

* * * * *